April 6, 1948.   C. JOHNSON   2,438,973
FLUID FLOW REGULATOR
Original Filed May 26, 1943

Inventor
CLARENCE JOHNSON
By Raymond W. Junkins
Attorney

Patented Apr. 6, 1948

2,438,973

UNITED STATES PATENT OFFICE 2,438,973

FLUID FLOW REGULATOR

Clarence Johnson, South Euclid, Ohio, assignor to Bailey Meter Company, a corporation of Delaware Original application May 26, 1943, Serial No. 488,600, now Patent No. 2,420,430, dated May 13, 1947. Divided and this application December 18, 1943, Serial No. 514,785

7 Claims. (Cl. 277—60)

This invention relates to fluid flow regulators, and more particularly to regulators which operate to maintain a flow of gaseous fluid at a constant pressure.

It is sometimes desirable that pressure fluid be supplied from a source where the pressure varies to a point of use at a constant pressure. In a Patent No. 2,420,430, granted to me on May 13, 1947, and of which this application is a division, there is disclosed gas analyzing apparatus which is successful only if a gas sample is supplied to it at a uniform rate. This situation is representative of many in which a flow of fluid at a constant pressure is required.

Apparatus for maintaining a flow of fluid at a constant pressure from a source of varying pressure may desirably include a chamber to which fluid is supplied from the source and from which fluid is vented in accordance with variations in pressure. The vent control may be obtained by providing a member which is acted upon by the chamber pressure and is positioned thereby to vary the venting in proportion to pressure changes. In order that the flow of fluid in the chamber may not cause the member to be positioned in a manner which is not representative of pressure changes, adjustable means may be provided for directing the flow into the chamber so as to eliminate such flow effect. The fluid may be supplied directly from the chamber to the point of use, or passed in series through other chambers with which similar pressure regulating means are provided.

An object of my invention is to provide an improved fluid flow regulator. Another object is to provide improved apparatus for receiving fluid from a source at varying pressures and supplying it to a point of use at a constant pressure. Yet, another object is to provide an improved regulator having a chamber connected to a source of variable pressure and to a point of use, and including means operating to vent the chamber in accordance with changes in pressure. Other objects will appear in the course of the following description.

In the accompanying drawing, there is shown one form which my invention may assume in practice. In this drawing.

Figure 1:
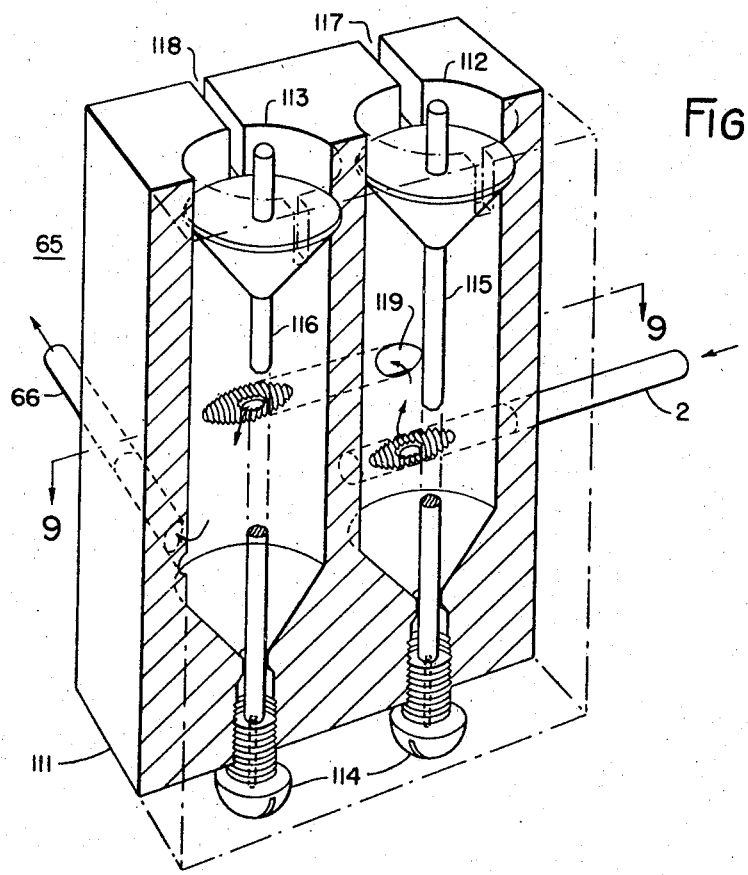
Fig. 1 is a phantom perspective drawing of my improved regulator.

Referring in particular to Fig. 1, it will be noted that there is shown a regulator 65 for regulating the flow of gaseous fluid from a supply conduit 2 to a discharge conduit 66. The flow regulator 65 comprises preferably a metallic block 111, in which are two longitudinal bores 112 and 113. These bores 112 and 113 are roughly coned at the bottom and each opens into a short cylindrical passage closed at the lower end by a removable screw 114. Positioned in the bores 112, 113 respectively are members 115, 116 comprising a long stem with a conical head near the upper end. The members 115, 116 are shown as resting by gravity against the ends of the screws 114. In this position, and with no flow of gas under pressure entering the conduit 2, the periphery of the base of the conical section of the member 115 (or the member 116) is adjacent the lower end of a cross-slot 117 or a cross-slot 118 respectively. These cross-slots are milled across the upper end of the assembly block 111 through the center of the bores 112 and 113. They are preferably of a different width, with the slot 117 of greater width than the slot 118.

A gas sample flow may be supplied to the conduit 2 from suitable cleansing-sampling apparatus, not shown, at a pressure which may vary from say three inches of water to five pounds gage pressure. This sample flows into the bore 112 below the conical head of the member 115, and the resulting pressure built up in the bore 112 raises the member 115. In doing so, a portion of the slot 117 at either side of the bore 112 is uncovered in varying degree by upward positioning of the conical head of the member 115. This allows a flow of the sample from the bore 112, below the conical head, to atmosphere through the two portions of the slot 117 at opposite sides of the bore 112. A variable portion of the sample entering the bore 112 will be wasted through slot 117 so that a constant predetermined pressure will be maintained in the bore 112 depending upon the weight of the member 115 and cross-sectional area of the conical head.

For best regulation I have found it desirable to have two such assemblies in series. A passage 119 is provided from the bore 112 to the bore 113 below the conical heads of the members 115, 116. The reduced pressure flow of the sample is effective through the passageway 119 to the interior of the bore 113 where it acts in turn upon the conical head of the member 116, positioning the member 116 vertically relative to the cross-slot 118 to a position dependent upon the weight and diameter of the conical section of the member 116 and upon the width of the slot 118. Thus through proper design I am enabled to obtain a static pressure within the bore 113, and in the outlet duct 66 at a uniform pressure, for example, of 1.6 inches of water plus or minus .01. This when the pressure available in the conduit 2 varies from three inches of water to over five pounds gage pressure. I desirably accomplish this in two stages, as illustrated in Fig. 1 and as just described.

The cylindrical heads of the members 115, 116 have approximately .0015 to .0030 inch diameter clearance, or just enough to allow freedom of positioning of the members. In general, the weight design of the members individually is just enough to offset the pressure effective on the conical head of the member times the area of said head, and to result in the uncovering of approximately one-half of the vertical elevation of the slots 117 or 118.

When there is no pressure flow through the assembly 65 the members 115, 116 may rest by gravity upon the ends of the screws 114. The screws 114 may either or each have a minute axial hole providing a continuous tiny bleed of air to discharge to the atmosphere any dirt, moisture or other foreign material which may be carried into the assembly 65 through the pipe 2.

Figure 3:
Fig. 3 is a detail of a conduit joining the assembly of Fig. 1.

It is essential that the pressure effective through the conduit passage 119 be representative only of the static pressure within the bore 112. I have found that if the conduit 2 enters on approximately the center line of the bore 112, the mushrooming flow will react to give an erroneous upward force on the conical head of the member 115. If the conduit 2 enters the bore 112 substantially tangentially to the periphery or wall of the bore, a vortex is created, which adversely affects the vertical positioning of the member 115. Furthermore, the centrifugal force of the sample in vortex motion is such that the flow entering the communicating passage 119 is at a pressure, the resultant of the static pressure within the bore 112 plus an impact or velocity pressure created by the centrifugal motion. I shape the inlet conduit 2, as shown in detail in Fig. 3, i. e. a radial opening ahead of a closed end of the tube, and provide a possibility of rotating the conduit 2 prior to fastening it permanently in place. I have found that through this construction I am enabled to insert a short section of conduit 2, as shown in Fig. 1, apply the expected pressure flow to the outer end of the conduit 2, and by slowly rotating the conduit 2 change the direction of the opening of the radial hole 2B to obtain a position for the same wherein all impact or velocity effect of the sample entering the bore 112 through the tube 2 is eliminated. In making this test I remove the member 116, plug the bore 113 with a cork, and attach the duct 66 to a manometer. By slowly rotating the conduit fitting 2 I can increase or decrease the pressure effective upon the manometer above and below a predetermined value. With the conduit 2 at the position neutral between such increase and decrease I am assured of a measurement of static pressure within the bore 112 uninfluenced by impact or velocity of flow.

Figure 2:
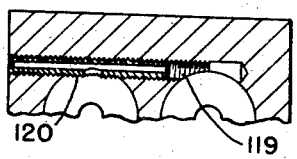
Fig. 2 is a section of a portion of Fig. 1.

A similar condition exists in connection with the flow through the passage 119 into the bore 113. Without taking special provisions, I would encounter a vortex action and the centrifugal force effect would be added to the static pressure effect upon the fluid in the outlet duct 66. To counteract this erroneous action I provide a screw 120 (refer to Fig. 2) threaded into the wall separating the bores 112, 113 and which is adjusted adjacent the opening of the passage 119 into the bore 113. The usual desirable adjustment is with the screw 120 assuming a position approximately as shown in Fig. 2. In this position the side outlet opening of the part 120 is so positioned that the impact effect of the sample entering the bore 113 through the passage 119 is eliminated and the pressure effective in the outlet duct 66 is the static pressure of the fluid within the bore 113. Having adjusted elements 2 and 120 during calibration of the unit they are then soldered permanently in place.

What I claim as new, and desire to secure by Letters Patent of the United States, is:

1. A flow regulator comprising, a body having a vertical chamber therein open at the top and closed at the bottom, a vertically reciprocable member in said chamber formed to fit the wall of said chamber with close clearance near the top of said member and chamber, the body having an opening or passage from the chamber through the wall of the chamber and extending downwardly from the top of said chamber a relatively short distance, an inlet near the lower end of said chamber, and an exit passage for continuous discharge of gas from the chamber below said member, whereby when gas under variable pressure is admitted to the chamber its pressure lifts said member thus uncovering a portion of said opening or passage extending downwardly from the top of said chamber to bleed gas from the chamber and a position of equilibrium is reached wherein a gas pressure within the chamber is attained determined by the area of the top of the member and the weight of the member.

2. The combination of claim 1 including means for minimizing pressure error on said member due to impact or velocity of the entering gas.

3. A fluid flow regulator of the type claimed in claim 1 having substantially duplicate stages of pressure control arranged in series with each stage constructed to deliver gas to the succeeding stage at a lower pressure than received.

4. A flow regulator for a gaseous fluid comprising, a body having a cylindrical vertical chamber therein open at the top to the atmosphere and closed at the bottom, a vertically reciprocable member in said chamber formed to fit the wall of said chamber with close clearance near the top of said member and chamber, the body having a slot-like opening or passage through the wall of the chamber and extending downwardly from the open top of the chamber a distance greater than the vertical amount of close clearance portion of said member, an inlet tube connected to said chamber near the lower portion thereof, an exit passage through the wall of the body below the top of said member in its lowest position, whereby when gaseous fluid is admitted under pressure to the chamber the member is lifted thus uncovering a portion of said slot opening to bleed fluid from the chamber to the atmosphere and a position of equilibrium for the member is reached wherein a fluid pressure within the chamber (and in the exit passage) is attained determined by the area of the top of said member and the weight of the member, and means directionally controlling the entering fluid to eliminate swirl or impact effects against said member.

5. A stage flow regulator for a gaseous fluid comprising, the first stage flow and pressure regulator claimed in claim 4, a second stage similar flow and pressure regulator adjacent the first regulator in said body, a communicating passage between the two regulators comprising the exit from the first and the entrance to the second, and means in said communicating passage adjustable to minimize swirl or impact effects against the member of the second stage regulator of the fluid entering the second regulator, the said member and slot of one differing from the other to attain desired step stages in pressure and flow regulation of the fluid.

6. A pressure and flow regulator for low pressure gaseous fluids comprising a body having a chamber with vertical side walls, said chamber being closed at the bottom and open to the atmosphere at the top, a plug and stem assembly in said chamber and vertically movable therein, means guiding the stem and supporting the same with the plug near the top of the chamber, said plug having a close working fit with said vertical walls, a slot through the body extending into the chamber and downwardly to near the plug top when supported, an inlet passage for delivering gas to said chamber near the lower end thereof, an exit passage through the wall of said chamber below said plug in its supported position, the weight per unit of exposed area of said plug being such that the gaseous fluid entering the chamber lifts the plug and causes the escape of sufficient fluid to atmosphere through the slot to reduce the exit pressure to that predetermined by the said weight, and means to prevent undesired movement of said plug resulting from a swirl or impact of said entering fluid.

7. The regulator as defined in claim 6 in which the last-mentioned means comprises an opening for the entering fluid so directed as to provide the desired results.

CLARENCE JOHNSON.

REFERENCES CITED

The following references are of record in the file of this patent:

UNITED STATES PATENTS

| Number | Name | Date |
|---|---|---|
| Re. 4,346 | Doyle | Apr. 18, 1871 |
| 83,320 | Richardson | Oct. 20, 1868 |
| 196,106 | Anderson | Oct. 16, 1877 |
| 1,080,000 | Citroen | Dec. 2, 1913 |
| 1,134,109 | Daniels | Apr. 6, 1915 |
| 1,676,999 | Mobley | July 10, 1928 |
| 1,883,190 | Welcker | Oct. 18, 1932 |
| 2,017,824 | Wade | Oct. 15, 1935 |
| 2,275,608 | Brisbane | Mar. 10, 1942 |
| 2,308,583 | Berges | Jan. 19, 1943 |

FOREIGN PATENTS

| Number | Country | Date |
|---|---|---|
| 21,680 | Norway | Aug. 21, 1911 |
| 278,957 | Great Britain | Oct. 20, 1927 |